United States Patent
Anthony

(10) Patent No.: US 12,077,480 B2
(45) Date of Patent: Sep. 3, 2024

(54) HIGH SOLIDS SUSPENSION FERTILIZER

(71) Applicant: Koch Agronomic Services, LLC, Wichita, KS (US)

(72) Inventor: Renil John Anthony, Lenexa, KS (US)

(73) Assignee: Koch Agronomic Services, LLC, Wichita, KS (US)

( * ) Notice: Subject to any disclaimer, the term of this patent is extended or adjusted under 35 U.S.C. 154(b) by 0 days.

(21) Appl. No.: 16/146,282

(22) Filed: Sep. 28, 2018

(65) Prior Publication Data

US 2019/0100471 A1 Apr. 4, 2019

Related U.S. Application Data

(60) Provisional application No. 62/565,943, filed on Sep. 29, 2017.

(51) Int. Cl.
| | | |
|---|---|---|
| *C05B 17/02* | (2006.01) | |
| *C05C 11/00* | (2006.01) | |
| *C05D 9/02* | (2006.01) | |
| *C05G 3/50* | (2020.01) | |
| *C05G 3/60* | (2020.01) | |
| *C05G 3/70* | (2020.01) | |
| *C05G 5/27* | (2020.01) | |
| *C05G 5/30* | (2020.01) | |

(52) U.S. Cl.
CPC .............. *C05B 17/02* (2013.01); *C05C 11/00* (2013.01); *C05D 9/02* (2013.01); *C05G 3/50* (2020.02); *C05G 3/60* (2020.02); *C05G 3/70* (2020.02); *C05G 5/27* (2020.02); *C05G 5/37* (2020.02)

(58) Field of Classification Search
CPC ... C05G 5/27; C05G 3/60; C05G 3/70; C05G 5/37; C05G 5/38; C05G 5/30; C05B 17/02; C05D 9/02; C05C 11/00
See application file for complete search history.

(56) References Cited

U.S. PATENT DOCUMENTS

| | | | | |
|---|---|---|---|---|
| 2,869,996 A * | 1/1959 | Vierling | ..................... | C05B 7/00 71/29 |
| 3,234,004 A * | 2/1966 | Smith | ..................... | C05B 7/00 71/28 |
| 3,679,390 A | 7/1972 | Young | | |
| 3,961,932 A | 6/1976 | Miller | | |
| 4,348,424 A * | 9/1982 | Consolazio | .............. | A01N 3/00 427/4 |
| 5,043,007 A * | 8/1991 | Davis | ..................... | C05G 5/30 71/31 |
| 5,597,399 A * | 1/1997 | Basu | ..................... | C05D 3/00 71/903 |
| 6,364,926 B1 * | 4/2002 | Gryzik | ..................... | C05G 5/20 71/64.1 |
| 7,445,657 B2 | 11/2008 | Green | | |
| 8,221,515 B2 | 7/2012 | Goodwin | | |
| 8,685,134 B2 | 4/2014 | Goodwin | | |
| 9,187,380 B2 | 11/2015 | Goodwin et al. | | |
| 9,481,613 B2 | 11/2016 | Martin | | |
| 2004/0050126 A1 | 3/2004 | Green | | |
| 2005/0005660 A1 | 1/2005 | Burnham et al. | | |
| 2010/0197739 A1 * | 8/2010 | Dexter | .................. | A01N 51/00 514/343 |
| 2013/0316902 A1 * | 11/2013 | Ward | ..................... | C05G 5/27 504/101 |
| 2016/0318817 A1 | 11/2016 | Chand | | |

FOREIGN PATENT DOCUMENTS

| | | |
|---|---|---|
| EP | 1655275 | 5/2006 |
| WO | 97/00840 | 1/1997 |
| WO | 2011/80764 | 7/2011 |
| WO | 2011/080764 | 7/2011 |
| WO | 2014/128468 | 8/2014 |
| WO | 2015/128620 | 9/2015 |

OTHER PUBLICATIONS

International Search Report and Written Opinion mailed May 9, 2019 in corresponding PCT/US2018/053450 filed Sep. 28, 2018.
Allowed Claims from European application No. 18862999.2, filed Dec. 13, 2021 (2 pages).
Intention to Grant European application No. 18862999.2, mailed Sep. 25, 2023 (5 pages).
Omex K41, www.omex.com/product/k41/, 1 page. access date: Apr. 23, 2019.
Access date: Apr. 23, 2019 Omex 3X Emulsion, www.omex.com/product/3x-emulsion/, 1 page.
Access date: Apr. 23, 2019 OMEXT Citromax, www.omex.com/product/citromax/, 1 page.

* cited by examiner

*Primary Examiner* — Jennifer A Smith

(57) ABSTRACT

High solids suspension fertilizers containing macro and micronutrients are provided herein. The fertilizers comprise at least one nutrient suspended in a liquid medium, along with a thickener and a dispersant. The liquid compositions advantageously comprise a suspension of larger fertilizer particles compared to prior art compositions, providing for a high solids content. The fertilizers are compatible with fungicide and insecticide seed treatments in coating agronomically important substrates, such as crop seed or prilled and granulated fertilizer. Also provided are methods of producing liquid fertilizers.

7 Claims, No Drawings

HIGH SOLIDS SUSPENSION FERTILIZER

CROSS-REFERENCE TO RELATED APPLICATIONS

The present application claims the priority benefit of U.S. Provisional Patent Application Ser. No. 62/565,943, filed Sep. 29, 2017, entitled High solids suspension fertilizer, incorporated by reference in its entirety herein.

BACKGROUND OF THE INVENTION

Field of the Invention

The present invention is generally directed to stable, liquid suspension fertilizer compositions having high solids content and applicable to deliver high levels of macronutrients and/or micronutrients to seeds and plants.

Description of the Prior Art

Target delivery of the right fertilizer combination of macronutrients and micronutrients to growing crops has been a constant challenge considering plant type, growth stage, soil conditions, environmental influence, and many other factors. Of the several methods of in-furrow application of fertilizers, applying dry fertilizer granules is one of the most prevalent. Typically, in-furrow fertilizers comprise mainly of macronutrients (N—P—K) with some inclusion of micronutrients, such as zinc and sulfur. These micronutrients are usually blended during bulk granule production or dusted or sprayed onto the finished macronutrient granule, such as is described in WO 2014/128468 and WO 2011/080764, both of which are incorporated herein in their entirety.

These aforementioned processes either employ non-aqueous solvents or use soluble forms of micronutrients to achieve a liquid phase-sprayable micronutrient formulation. Soluble forms of fertilizers are quickly available to plant roots. However, owing to their solubility, they are also susceptible to run-off or movement away from the target site. To address this issue, typically a combination of soluble and insoluble nutrient molecules is incorporated into the mix. The insoluble part, however, presents a challenge in terms of stability when prepared as liquid formulation resulting in settling, caking, or flocculation. Furthermore, non-aqueous solvent-based fertilizer formulations are not readily acceptable due to volatility or toxicity of the solvents involved. Oil-based solvents could be another way to incorporate insoluble fertilizers. However, applicability of oil-based formulations in process equipment and the resulting tackiness or caking of granules in the storage bins can present a real process limitation.

Another substrate for applying macro and/or micronutrients is crop seeds. Nutrients applied to seeds ensure healthy emergence by supplying the right amounts of essential compounds for critical plant processes, thereby providing vigor and immunity towards adverse growth conditions.

Crop seeds are currently treated with a mix of natural and synthetic pesticides before planting to protect the seed and the emerging seedling. The treatment mixture is combined in a treatment tank and sprayed onto untreated seeds, or individual treatments are pumped through separate lines and sprayed on the seeds in the treating equipment. The fertilizer application on seeds is done using a powder treater, wherein dry powdered fertilizer is sprinkled onto wet seeds exiting out the treating equipment. This creates safety and health concerns for the operating personnel due to the airborne particulates that could concentrate indoors to potentially explosive levels and/or present a respiratory hazard. Typically for such locations, expensive systems such as powder feeders and dust collection systems are employed to properly handle powder applications. Furthermore, the primary drawback of using dry powdered fertilizer for seed application is that correct dosage of fertilizer per seed is difficult to control, which can result in over or under treatment, having negative effects on the seed and the young seedling. Lastly, the addition of a powder can increase seed to seed friction, and this can lead to uneven seeding in the field.

SUMMARY OF THE INVENTION

Embodiments of the present invention are generally directed to liquid suspensions of fertilizer to be used for application in seed treatment and fertilizer coatings that can be sprayed onto the substrate (seed or fertilizer surface) with minimal to no dust generation during and after treatment. This application method provides target delivery of fertilizer to the substrate at a precise application rate with minimal loss from the application site, thereby minimizing equipment clean-up, production down time and significantly reducing safety and health concerns associated with airborne fertilizer particulates.

In one embodiment, there is provided a liquid fertilizer composition. The composition comprises a source of at least one nutrient suspended in a liquid medium, a thickener, a dispersant, and a solids content of at least about 20% by weight. The composition is substantially free of styrene (meth)acrylic copolymer. The composition may be used in a method of fertilizing a crop comprising applying the liquid fertilizer to the surface of a seed or granule.

In another embodiment, there is provided a liquid fertilizer composition. The composition comprises a source of at least one nutrient suspended in a liquid medium and having an average particle size larger than about 230 mesh. The composition further comprises a thickener, a dispersant, and a solids content of at least about 20% by weight. The composition may be used in a method of fertilizing a crop comprising applying the liquid fertilizer to the surface of a seed or granule.

In yet another embodiment, there is provided a method of producing a liquid fertilizer composition. The method comprises combining a source of at least one nutrient, a thickener, and a dispersant in a liquid medium to form a liquid suspension. The source of at least one nutrient is added to the liquid as solid particles without wet milling the particles to reduce particle size.

DETAILED DESCRIPTION OF THE PREFERRED EMBODIMENT

Embodiments of the present invention are generally directed to stable, liquid suspension fertilizer compositions having high solids content and applicable to deliver high levels of macronutrients and/or micronutrients to seeds and plants. The compositions generally comprise a source of at least one nutrient suspended in a liquid medium, a thickener, and a dispersant.

The source of at least one nutrient is generally provided as a solid powder. As used herein, the term "nutrient" refers to both micronutrients and macronutrients. The source of at least one nutrient may comprise one or more macronutrients, one or more micronutrients, or a combination of both macronutrients and micronutrients.

Macronutrients are essential plant nutrients that are required in relatively larger amounts (as compared to micronutrients) for healthy plant growth and development. In contrast, micronutrients are essential plant nutrients that are needed in lesser quantities. In certain embodiments, the source of at least one nutrient comprises a macronutrient selected from the group consisting of nitrogen, phosphorus ($P_2O_5$), potassium, calcium, sulfur, and magnesium. In certain embodiments, the source of at least one nutrient comprises a micronutrient selected from the group consisting of zinc, manganese, iron, boron, chlorine (chloride), copper, molybdenum, nickel, cobalt, selenium, and sodium. It should be understood by those of skill in the art that other macronutrients and micronutrients known in the art may also be used in accordance with embodiments of the present invention.

Embodiments of the present invention are advantageously capable of comprising higher nutrient content, and specifically higher micronutrient content, than prior art liquid fertilizers. For example, in certain embodiments, the liquid fertilizer composition comprises a greater amount of micronutrient(s) than macronutrient(s). In certain embodiments, the liquid fertilizer has a micronutrient content of at least about 5% by weight, preferably at least about 10% by weight, more preferably at least about 15% by weight, and more preferably at least about 20% by weight, with the total weight of the liquid fertilizer composition taken as 100% by weight. In certain embodiments, the liquid fertilizer has a micronutrient content of about 5% to about 50% by weight, preferably about 10% to about 40% by weight, more preferably about 15% to about 30% by weight, and more preferably about 20% to about 25% by weight, with the total weight of the liquid fertilizer composition taken as 100% by weight. In certain embodiments, the liquid fertilizer has a zinc content of about 1% to about 40% by weight, preferably about 5% to about 30% by weight, and more preferably about 10% to about 25% by weight, with the total weight of the liquid fertilizer composition taken as 100% by weight. In certain embodiments, the liquid fertilizer has a manganese content of about 0.1% to about 10% by weight, preferably about 0.5% to about 8% by weight, and more preferably about 1% to about 5% by weight, with the total weight of the liquid fertilizer composition taken as 100% by weight. In certain embodiments, the liquid fertilizer has an iron content of about 0.1% to about 5% by weight, preferably about 0.2% to about 3% by weight, and more preferably about 0.5% to about 2% by weight, with the total weight of the liquid fertilizer composition taken as 100% by weight. In certain embodiments, the liquid fertilizer has a macronutrient content (e.g., phosphorus and/or nitrogen) of about 1% to about 30% by weight, preferably about 5% to about 25% by weight, and more preferably about 10% to about 20% by weight, with the total weight of the liquid fertilizer composition taken as 100% by weight. As will be appreciated by one of skill in the art, any agriculturally acceptable form of the nutrient may be used within the scope of certain embodiments of the present invention. The nutrient powder may be comprised of at least one nutrient in an oxide form, in a sulfate form, a salt form, or a mineral form, or a combination of oxide, sulfate, salt, and/or mineral forms.

In particularly preferred embodiments, the nutrient source comprises a source of phosphate, a source of manganese, and a source of zinc. The phosphate source may comprise monoammonium phosphate, diammonium phosphate, rock phosphate, and mixtures thereof. The manganese source may comprise manganese sulfate, manganese chloride, manganese nitrate, manganese oxide, and mixtures thereof. The zinc source may comprise zinc sulfate, zinc chloride, zinc oxide, zinc nitrate, and mixtures thereof. In certain such embodiments, the nutrient source(s) comprise a phosphorous content of about 20% to about 30% by weight, a zinc content of about 15% to about 25% by weight, a manganese content of about 1% to about 10% by weight, and a nitrogen content of about 0.5% to about 8% by weight, based on the total weight of the source of at least one nutrient taken as 100% by weight.

In other preferred embodiments, the nutrient source comprises a source of zinc, a source of manganese, and a source of iron. In certain such embodiments, the nutrient source(s) comprises a zinc content of about 30% to about 50% by weight, a manganese content of about 5% to about 15% by weight, and an iron content of about 0.1% to about 5% by weight, based on the total weight of the source of at least one nutrient taken as 100% by weight.

In one or more embodiments, the source of at least one nutrient is provided as a powder having an average particle size larger than about 325 mesh (about 44 μm average diameter), preferably larger than about 270 mesh (about 53 μm average diameter), and more preferably larger than about 230 mesh (about 63 μm average diameter), U.S. Standard screen. In certain embodiments, the source of at least one nutrient is provided as a powder having an average particle size of about 100 mesh (about 149 μm average diameter) to about 325 mesh, preferably about 120 mesh (about 125 μm average diameter) to about 230 mesh, more preferably about 140 mesh (about 105 μm average diameter) to about 200 mesh (about 74 μm average diameter), U.S. Standard screen. In certain embodiments, the liquid fertilizer composition comprises about 20% to about 80% by weight, preferably about 30% to about 70% by weight, and more preferably about 40% to about 60% by weight of the source of at least one nutrient, based on the total weight of the liquid fertilizer composition taken as 100% by weight. In certain preferred embodiments, the fertilizer composition comprises at least about 20% by weight, preferably at least about 40% by weight of the source of at least one nutrient, based on the total weight of the liquid fertilizer composition taken as 100% by weight.

Exemplary powdered nutrient sources are described in U.S. Pat. Nos. 7,445,657; 8,221,515; 8,685,134; and 9,187, 380; each of which is incorporated herein in its entirety.

The thickener (or thickening agent) acts as a rheology modifying additive designed to hydrate in water and swell. The thickener can be any of a variety of rheology modifying compounds, both natural (e.g., clays and gums) and synthetic (e.g., synthetic polymers). In certain embodiments, the fertilizer composition comprises a thickener selected from the group consisting of xanthan gum, guar gum, gum Arabic, smectite, kaolinite, alkali swellable emulsion (ASE) thickeners, hydrophobically modified alkali swellable emulsion (HASE) thickeners, hydrophobically ethoxylated urethane (HEUR) thickeners, and combinations thereof. In certain embodiments, the composition comprises a combination of at least two of the aforementioned thickeners. In certain preferred embodiments, the thickener comprises xanthan gum. In certain embodiments, the liquid fertilizer composition comprises about 0.01% to about 1% by weight, preferably about 0.05 to about 0.5% by weight, and more preferably about 0.1% to about 0.2% by weight of the thickener, with the total weight of the liquid fertilizer composition taken as 100% by weight.

The dispersant (or dispersing agent) acts as a wetting and dispersing additive to stabilize the solid particles and prevent flocculation. The dispersant molecule is preferably composed of two parts, namely an anchoring group(s) and a polymeric chain. In the compositions of the present invention, the anchoring group is one that attaches the dispersant molecule to the fertilizer particle by means of either electrostatic attraction, ionic groups, hydrogen bonding, or a combination of these. The particular anchoring group is preferably selected based upon the fertilizer particle that requires stabilization. In certain embodiments, the dispersant comprises an anchoring group selected from the group consisting of amino, carboxylic, sulfonic, phosphoric acids, or the salts thereof. The polymeric chain should be selected with a molecular weight sufficient to provide a steric effect around each particle. In certain embodiments, the dispersant comprises a polymeric chain selected from the group consisting of polyvinyl alcohol, phosphate esters, styrene, acrylic acid based, polyisobutylene, polyesters, poly methyl methacrylate, polyethylene oxides, and combinations thereof. In particularly preferred embodiments, the dispersant is an anionic dispersant (such as Esperse 349 by Ethox Chemicals). In certain embodiments, the liquid fertilizer composition comprises about 0.1% to about 10% by weight, preferably about 0.5 to about 5% by weight, and more preferably about 1% to about 3% by weight of the dispersant, based on the total weight of the liquid fertilizer composition taken as 100% by weight.

In a preferred embodiment, the liquid fertilizer is substantially free of any styrene (meth)acrylic copolymer. That is, the liquid fertilizer composition comprises less than about 2% by weight styrene (meth)acrylic copolymer, preferably less than about 1% by weight styrene (meth)acrylic copolymer, and more preferably about 0% by weight styrene (meth)acrylic copolymer, based upon the weight of the liquid fertilizer composition taken as 100% by weight.

In certain embodiments, the liquid fertilizer composition may further comprise a surfactant or surface tension modifier. The surfactant can be used to improve wetting of particles to facilitate anchoring of dispersant anchor groups. Typically, the surfactant comprises organic compounds, with a branched, linear or aromatic hydrocarbon, fluorocarbon or siloxane chain as the hydrophobic group and a hydrophilic group. The surfactant may include non-ionic surfactants, anionic surfactants, cationic surfactants, amphoteric surfactants, silicone surfactants, fluorinated surfactants, polymerizable surfactants, or mixtures thereof. Exemplary anionic surfactants include, but are not limited to, alkylbenzene suphonates, α-olefin sulphonates, paraffin sulphonates, sulphonated methyl esters, sulphonated fatty acids, sulphosuccinates. Surfactants based on the sulphate and phosphate ester chemistries may include alkyl sulphates, alkyl ether sulphates, ether carboxylates, acyl sarcosinates, alkyl phthalamates, isethionates, and/or taurates. Exemplary non-ionic surfactants include, but are not limited to, alkyl phenol ehtoxylates, fatty alcohol ethoxylates, polyoxethylene esters of fatty acids, methyl ester ethoxylates, polyalkylene oxide block co-polymers, amine ethoxylates, fatty alkanolamides, amine oxides, esters of polyhydric alcohols and fatty acids, flycol esters, glycerol esters, polyglycerol esters, anhydrohexitol esters, polyoxyalkylene polyol esters alkyl poly glucosides, and gemini surfactants. Exemplary amphoteric surfactants include, but are not limited to, aminopropionates, iminodipropionates, imidazoline-based, betaine, and others. In certain embodiments, the liquid fertilizer composition comprises about 0.01% to about 5% by weight, preferably about 0.05% to about 3% by weight, and more preferably about 0.1% to about 1% by weight of the surfactant, based on the total weight of the liquid fertilizer composition taken as 100% by weight In one or more embodiments, the liquid fertilizer composition further comprises an antimicrobial preservative (e.g., a biocide). In certain embodiments, the preservative is selected from the group consisting of 5-chloro-2-methyl-2H-isothiazol-3-one, 2-methyl-2H-isothiazol-3-one, bronopol (2-bromo-2-nitropropane-1,3-diol), sodium nitrite, 1,2-benzisothiazolin-3-one, glutaraldehyde, sodium o-phenylphenate, 2,2-dibromo-3-nitrilopropionamide, sodium hypochlorite, trisodium phosphate, and combinations thereof. In a particularly preferred embodiment, the preservative comprises a combination of 5-chloro-2-methyl-2H-isothiazol-3-one, 2-methyl-2H-isothiazol-3-one, and bronopol, such as the commercially-available Acticide LA1206 by Thor. It has been discovered that use of the antimicrobial preservative as described herein can limit the growth of any bacteria or fungus in the formulation, thus maintaining stability and preventing spoilage of the formulation during long term storage, without negatively impacting seed germination. In certain embodiments, the liquid fertilizer composition comprises about 0.01% to about 1% by weight, preferably about 0.05 to about 0.5% by weight, and more preferably about 0.1% to about 0.2% by weight of the preservative, based on the total weight of the liquid fertilizer composition taken as 100% by weight.

In one or more embodiments, the liquid fertilizer composition further comprises a defoamer additive (or antifoaming agent). The defoamer is a chemical additive that reduces and hinders the formation of foam during production and use of the liquid fertilizer. The defoamer may comprise a variety of compounds known in the art, such as insoluble oils, polydimethylsiloxanes, and other silicones, alcohols, stearates, glycols, and combinations thereof. An exemplary commercially-available defoamer is the silicone-free, polymer-based BYK-016 by BYK. Another exemplary commercially-available defoamer is PC5450 by Performance Chemicals, LLC (Concord, N.H.). In certain embodiments, the liquid fertilizer composition comprises about 0.01% to about 1% by weight, preferably about 0.05 to about 0.5% by weight, and more preferably about 0.1% to about 0.2% by weight of the defoamer, based on the total weight of the liquid fertilizer composition taken as 100% by weight.

In one or more embodiments, the liquid fertilizer further comprises an additive that improves it applicability on substrates. Certain such additives in the liquid fertilizer may include emulsions, solutions, dispersion, or suspensions of various waxes and/or polymers. The waxes and polymers can be of natural or synthetic origin. In certain embodiments, the additive is a wax. In certain preferred embodiments, the additive is carnauba wax. When included, the liquid fertilizer generally comprises about 1% to 50% by weight, preferably from about 5% to about 40% by weight, and more preferably from about 10% to about 25% by weight of waxes or polymers. The use of such waxes or polymers on the seeds or granules can provide performance advantages, such as reduced dust and improved flow, among other performance parameters.

Additional components may also be included in the liquid fertilizer compositions, as needed or desired. For example, surfactants or acidifying agents may be included as needed to achieve a desired viscosity or pH level. Regardless of the embodiment, the liquid fertilizer composition generally has a density of about 0.9 g/mL to about 1.6 g/mL, preferably about 1.0 g/mL to about 1.4 g/mL, and more preferably about 1.1 g/mL to about 1.3 g/mL. However, in some embodiments, the liquid fertilizer composition has a density of about 0.9 g/mL to about 2.0 g/mL, preferably about 1.0 g/mL to about 1.8 g/mL, and more preferably about 1.1 g/mL to about 1.6 g/mL. The composition generally has a 50 rpm Brookfield viscosity of about 500 cps to about 1500 cps, preferably about 600 cps to about 1200 cps, and more preferably about 700 cps to about 1000 cps. However, in certain embodiments, the composition has a 50 rpm Brookfield viscosity of about 200 cps to about 1500 cps, preferably about 400 cps to about 1200 cps, and more preferably about 600 cps to about 1000 cps. The composition will generally have a pH of about 3.0 to about 8.0, preferably about 3.5 to about 7.0, and more preferably about 4.0 to about 5.0. The compositions generally have a solids content of at least about 20% by weight, preferably at least about 30%, more preferably at least about 40% by weight, and even more preferably at least about 60%, based on the total weight of the liquid fertilizer composition taken as 100% by weight. In certain embodiments, the liquid fertilizer composition comprises a solids content of about 20% to about 80% by weight, preferably about 30% to about 70% by weight, and more preferably about 40% to about 60% by weight, based on the total weight of the liquid fertilizer composition taken as 100% by weight.

The liquid fertilizer compositions are provided as liquid suspensions, with the solids suspended in a liquid medium. In particularly preferred embodiments, the liquid medium is water, thereby providing aqueous suspensions. However, in certain embodiments, other liquid mediums may be used. Regardless the embodiment, the liquid fertilizer compositions generally comprises from about 20% to about 80% by weight, preferably from about 30% to about 70% by weight, and more preferably from about 40% to about 60% by weight of the liquid medium, with the total weight of the liquid fertilizer composition taken as 100% by weight.

Liquid suspensions in accordance with embodiments of the present invention are typically shelf stable for at least about 6 months, and preferably for at least about 12 months. As used herein, the term "shelf stable" means that the suspension exhibits no particle caking, and that any settled particles are easily re-suspended by simple agitation for the specified period of time.

Embodiments of the present invention are also directed to a method of producing a liquid fertilizer composition. The method comprises combining a source of at least one nutrient, a thickener, and a dispersant in a liquid medium to form a liquid suspension.

It has been discovered that achieving liquid fertilizers with the desired operational and storage rheology profiles and high insoluble solids content requires a particular manufacturing procedure. The process, including the particular sequential addition of components, is critical to achieve uniform particle dispersion and wetting in order to present maximum surface area on the particles for dispersant stabilization. First, the thickener is added to the liquid medium. After adding the thickener and thoroughly mixing to achieve the desired viscosity, a first portion of the dry fertilizer component (i.e., the source of macro- and/or micro-nutrient) is added to the liquid medium at about 10% to about 50%, preferably about 20% to about 35%, of the total weight of the component prescribed in the final formulation and mixed, typically for about 5 to about 15 minutes, or until homogenous. While continuously stirring the mixture, a first portion of the dispersant is added to the liquid medium at about 10% to about 50%, preferably about 20% to about 35% of the total weight of the dispersant prescribed in the final formulation and continued mixing for about 5 to about 15 minutes, or until homogenous. A second portion of the dry fertilizer component (i.e., the source of macro- and/or micro-nutrient) is added to the liquid medium at about 10% to about 50%, preferably about 20% to about 35%, of the total weight of the component prescribed in the final formulation and mixed, typically for about 5 to about 15 minutes, or until homogenous. Again, while continuously stirring the mixture, a second portion of the dispersant is added to the liquid medium at about 10% to about 50%, preferably about 20% to about 35% of the total weight of the dispersant prescribed in the final formulation and continued mixing for about 5 to about 15 minutes, or until homogenous. The mixing is continued in this sequence with incremental addition of the dry fertilizer component(s) and subsequent addition of the dispersant, until the desired weight of both of these components has been included in the mixture. Additionally, defoamer may be added to the liquid medium before adding any other components (i.e., before the thickener) or at other times during the process as needed to control foaming.

Any deviation from the above sequence of addition may result in a formulation that will exhibit instability, primarily in the form of gelling and hardening during long term storage. Notably, the source of at least one nutrient is added to the water as solid particulates without being subjected to wet milling (or micro pulverizing) to reduce the mesh size. This is a particular advantage over prior art methods that require wet milling solid fertilizer particles to reduce the size below about 50 microns (about 325 mesh size) to achieve stable suspensions.

In certain preferred embodiments, the liquid fertilizer compositions are provided as ready-to-use fertilizer compositions. As used herein, "ready-to-use" means that the liquid fertilizer compositions do not need to be diluted, for example with water, or mixed with other ingredients prior to application. However, it is within the scope of the present invention that the liquid fertilizer compositions are provided as concentrated or multi-part formulations, which require dilution and/or mixing with additional components prior to application.

In certain embodiments, and particularly when used as seed treatments, additional components may be added to the liquid fertilizer suspensions, as crop protectants and/or enhancement additives. These additional components may be added at the time of manufacture after adding all of the dry fertilizer and dispersant, or these components may be added to the suspensions immediately prior to applying the treatment to seeds or granules. Such additional components may comprise one or more insecticides, fungicides, nematicide, biologically active components, polymers, or a combination of thereof.

As used herein, the term "insecticide" refers to those substances both naturally occurring or synthetically derived that are targeted against "insects," which are defined by the United States Environmental Protection Agency (EPA) as any of the numerous small invertebrate animals generally having the body more or less obviously segmented, for the most part belonging to the class insecta, comprising six-legged, usually winged forms, as for example, beetles, bugs, bees, flies, and to other allied classes of arthropods whose members are wingless and usually have more than six legs, as for example, spiders, mites, ticks, centipedes, and wood lice. The insecticide(s) used herein may be any of the various commercially-available insecticidal active ingredients, which are generally labeled as intended for use as insecticide.

As used herein, the term "fungicide" refers those substance both naturally occurring or synthetically derived that are targeted against "fungi," which are defined by the EPA as any non-chlorophyll-bearing thallophyte (that is, any non-chlorophyll-bearing plant of a lower order than mosses and liverworts), as for example, rust, smut, mildew, mold, yeast, and bacteria, except those on or in living man or other animals and those on or in processed food, beverages, or pharmaceuticals. The insecticide(s) used herein may be any of the various commercially-available fungicide active ingredients, which are generally labeled as intended for use as fungicide.

As used herein, the term "nematicide" refers to those substance both naturally occurring or synthetically derived that are targeted against "nematodes," which are defined by the EPA as invertebrate animals of the phylum nemathelminthes and class nematoda, that is, unsegmented round worms with elongated, fusiform, or saclike bodies covered with cuticle, and inhabiting soil, water, plants, or plant parts; may also be called nemas or eelworms. The nematicide(s) used herein may be any of the various commercially-available nematicide active ingredients, which are generally labeled as intended for use as nematicide.

Biologically active components can include known microbials for enhancement of plant growth related to crop protection and nutrient delivery, both symbiotic and asymbiotic. Exemplary microbials particularly for seeds treatments are any of a variety of commercially-available seed inoculants.

The polymer used in the treatment of seeds may include a natural or synthetic polymer as a combination or independent forms of celluloses including methyl celluloses, ethyl celluloses, hydroxymethyl celluloses, hydroxypropyl/methyl celluloses, carboxy methyl celluloses, and dextrins, malto-dextrins, alginates, polysaccharides, fats, oils, proteins, gum arabics, lignosulfonates, starches, shellacs zeins, gelatins, chitosan. Vinyl based polymers such as polyvinyl alcohols, polyvinyl alcohol copolymers, polyvinyl pyrrolidones, polyvinyl acetates and polyvinyl acetate copolymers, vinylidene chlorides, vinylidene chloride copolymers. Acrylate polymers and copolymers, such as polyvinyl acrylates, polyethylene oxide polymers, acrylamide polymers and copolymers, polyhydroxyethyl acrylates, methylacrylamide polymers, vinylpyrrolidone/styrene copolymers, vinyl acetate/butyl acrylate copolymers, styrene/acrylic ester copolymers, vinyl acetate/ethylene copolymers, and polyurethane polymers.

The liquid fertilizer compositions are particularly suitable for liquid application as a coating on the surface of seeds and/or solid fertilizer granules prior to planting. Therefore, also provided herein are methods of treating seeds or fertilizer granules comprising applying the liquid fertilizer composition to the surface of the seeds or granules. A variety of seed types can be treated with the liquid fertilizer composition in accordance with embodiments of the present invention. A particularly preferred seed type is wheat seeds. However, other seed types can also realize the advantages of the present invention including, for example, corn, soy, cotton, and others. The liquid fertilizer may be applied, for example, at the time of sowing or pre-inoculation.

Methods of treating seeds or coating granule fertilizer with the liquid fertilizer can be performed using batch (e.g., rotary treater) or continuous (e.g., drum treater) treating equipment. One method of treating seeds or granule fertilizer comprises mixing all treatment components (including the liquid fertilizer and any additional components, as discussed above) in a treatment tank and pumping the treatment slurry to the drum or rotary coating location. The flow rate of the slurry is regulated based on the flow rate of the seeds/granules through the system to achieve the desired dosage on substrate. Another method comprises pumping all treatment components individually though separate lines to the treating location and spraying the treatments onto the seeds or granules. This method of treatment can avoid any potential incompatibility between treatment components and can aid in controlling rates of different ingredients based on requirement.

The amount of liquid fertilizer applied to the seeds or granules will depend on a number of factors, including seed or fertilizer type, topographical and geological considerations, and local and regional practices. However, in certain preferred embodiments, the liquid fertilizer composition is applied to the seeds or granules at an amount of about 0.1 to about 30 mL of fertilizer per kg of seeds or granules, preferably about 0.5 to about 20 mL of fertilizer per kg of seeds or granules, and more preferably about 1 to about 15 mL of fertilizer per kg of seeds or granules.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth production and testing of fertilizer compositions in accordance with embodiments of the present invention. It is to be understood, however, that these examples are provided by way of illustration and nothing therein should be taken as a limitation upon the overall scope of the invention.

Example I

Dry Fertilizer Preparation

In this example, two dry fertilizers (Fertilizer A and Fertilizer B) were prepared in order to be tested in liquid suspensions. The elemental breakdown of the micronutrient and macronutrient contents of Fertilizer A and Fertilizer B are provided in Table 1, below. P was provided in the form of $P_2O_5$. Zinc was provided in the form of zinc oxide and zinc sulfate. The other components were provided in the form of salts or minerals. The remaining percentages to make up 100% are provided by the oxides, sulfate, and or salts/minerals.

TABLE 1

Exemplary Dry Fertilizers.

| Nutrient | Fertilizer A | Fertilizer B |
|---|---|---|
| P | 25% | — |
| Zn | 20% | 40% |
| Mn | 5% | 10% |
| Fe | — | 1% |
| N | 4% | — |

Example II

Dispersant Selection

This experiment was aimed at testing appropriate dispersants for the liquid suspensions, which is critical in formulating a stable suspension fertilizer. The dispersant was tested by evaluating the viscosity change of the liquid formulation pre- and post-addition of the sample dispersant. An effective dispersant reduces the interparticle interaction between the fertilizer particles, which in turn reduces the viscosity of the given solution upon addition of the optimal dispersant. This ensures minimal to no flocculation between particles during long term storage. The dispersant selection was made based on the magnitude of viscosity reduction by the selected dispersants.

The sample fertilizer was prepared by mixing water with 0.1% xanthan gum, 0.01% defoamer, and 0.19% biocide. The mixture was thoroughly mixed to dissolve and hydrate the xanthan gum to provide the desired rheology profile. Then the dry fertilizer was added slowly and dispersed in the homogenizer for 30 mins. After 30 mins, the formulation was taken out, and the viscosity was measured immediately and recorded. Then, the formulation was put back in the mixer, and the selected dispersant was added slowly at about 2% and mixed for 5 mins. The formulation was taken out, and the viscosity was measured immediately and recorded. The results are provided in Table 2. The results presented in Table 2 are the viscosity values for Esperse-349, a phosphate ester based dispersant used in Fertilizer A and those for Byk-156 an ammonium polyacrylate based dispersant used in Fertilizer B.

TABLE 2

Viscosity of liquid suspension (cP).

|  | 2.5 rpm | 25 rpm | 50 rpm |
|---|---|---|---|
| Fertilizer A |  |  |  |
| Pre-dispersant | 10120 | 5421 | 2560 |
| Post dispersant | 7401 | 1230 | 840 |
| Fertilizer B |  |  |  |
| Pre-dispersant | 15566 | 9582 | 7400 |
| Post dispersant | 6700 | 1414 | 1015 |

Example III

Blending Methodology

Two liquid suspension fertilizer formulations (Formulation A and Formulation B) were prepared as described below. The mixing vessel was filled with specified amount of water. BYK-016 (defoamer) was weighed as indicated in the recipe and added slowly to avoid air entrapment in the mix. Defoamers are usually insoluble in the target system, so a colloidal solution was expected during addition and mixing. The xanthan gum (AEP Colloids) was weighed and added slowly to the vessel during mixing, with efforts made to avoid forming lumps when adding to the mixing vessel. After addition, mixing was continued for 15 minutes to ensure complete dissolution of the product. At this stage, the viscosity of the mixture was expected to increase. The mixer speed was increased to maintain adequate vortex. One quarter of the specified quantity of each dry fertilizer powder was weighed and added slowly to the mixing vessel. Mixing was continued for 10 minutes to ensure homogeneous dispersion of particulates. Before adding the powder, the powder was checked to ensure a homogeneous powder without clumps. One quarter of the specified quantity of the dispersant was weighed and add to the mixing tank slowly. Mixing was continued for 10 minutes. The previous two steps were repeated until all specified weight of dry fertilizer and dispersant was added to the mixture. As a last step, the specified amount of Acticide LA1206 was added to the mixing vessel, and mixing was continued for 5 minutes. Before addition of Acticide LA1206, it was ensured that the temperature of the tank mix was below 40° C./104° F.

The amount total amount of each component in Formulation A and Formulation B are provided in Table 3.

TABLE 3

Liquid suspension fertilizer compositions.

| Formulation A | % w/w | Formulation B | % w/w |
|---|---|---|---|
| Water | 57.66 | Water | 36.7 |
| Byk-016 | 0.05 | Byk-016 | 0.05 |
| Xanthan gum | 0.10 | Xanthan gum | 0.06 |
| Fertilizer A | 40.00 | Fertilizer B | 60.00 |
| Esperse 349 | 2.00 | Byk-156 | 3.00 |
| Acticide LA1206 | 0.19 | Acticide LA1206 | 0.19 |

Example IV

Shelf Stability Testing

The shelf stabilities of Formulation A and Formulation B were evaluated following protocol employed by Collaborative International Pesticides Analytical Council (CIPAC) for methods MT39.3 and MT46.3. Briefly, 100 ml of formulation was placed in 4° C., 25° C., and 40° C. for 4 weeks, and the formulation was observed for any settling, caking, or sagging.

TABLE 4

Shelf stability.

| Formulation A | Settling top layer, mm | Formulation B | Settling top layer, mm |
|---|---|---|---|
| 4° C. | 2 | 4° C. | 2 |
| 25° C. | 5 | 25° C. | 3 |
| 40° C. | 7 | 40° C. | 3 |

The sample with the maximum settling was Formulation A at 40° C., with 7 mm top layer of phase separation. However, there was no caking observed when mixed with a glass rod, and the sample was easily re-suspendable. All other samples showed no significant phase separation.

A control sample without any rheology additive (xanthan gum) was also tested. The control exhibited sever settling of the particles, with the bottom layer being difficult to re-suspend.

Example V

Germination Testing

Seeds were treated by mixing together a combination of pesticide (fungicide), Formulation A, red color pigment dispersant, and a water soluble polyvinylpyrrolidone at 35% solids in a batch rotary coater. 1 kilogram of untreated wheat seeds were placed in the spinning treater bowl, and a premixed slurry as outlined in the table was injected and allowed to spin for 10 secs, after which the seeds were collected and allowed to dry. For dry fertilizer A application, the slurry in the table (excluding the liquid formulation A) was sprayed on to the spinning seeds, and the Dry Fertilizer A was sprinkled on the wet seeds.

The amounts of each component in the treatment slurry are provided in Table 5.

TABLE 5

Treatment slurry for germination testing.

| Treatment Slurry | ml/100 kg | Density (g/ml) | g/100 kg |
|---|---|---|---|
| Fungicide (protioconazol + tebuconazol) | 50 | 1.15 | 57.5 |
| Liquid Formulation A | 710.23 | 1.32 | 937.5 |
| Red Color Dispersant | 62.50 | 1.04 | 65 |
| Polyvinylpyrrolidone | 446.43 | 1.05 | 468.75 |
| Total | 1269.15 | | 1528.75 |

Warm germination for treated wheat seeds were performed in moist paper towels at 25° C. For each sample, 2 replicates were included, each consisting of 50 seeds. After 5 days in the germination chamber, the seeds were counted to get a % germination.

Formulation A exhibited 94% germination, dry fertilizer A exhibited 95% germination, and the untreated wheat seed exhibited 96% germination. Notably, all samples showed above 90% germination, with no statistically significant negative effects from using the liquid version of Fertilizer A (Formulation A).

Example VI

Fertilizer Retention Testing

An aqueous extraction of the wheat seeds coated with Formulation A (containing Fertilizer A) and dry Fertilizer A was performed, and the extractant analyzed on Inductively Coupled Plasma-Mass Spectroscopy. 2 grams of treated seeds were placed in 10 ml of distilled water and vortexed for 1 min and left overnight (16 hrs) and then vortexed again for 1 min and centrifuged. The supernatant was carefully collected and filtered through a 0.45 um syringe filter. 1 ml of the filtered supernatant was then placed in 99 ml of DI water. A 1% nitric acid dilution was made and the sample was analyzed for the presence of soluble Zn.

As shown in Table 6, below, the results indicate that using liquid Formulation A provides about 2.5 times higher retention on wheat seeds than using dry Fertilizer A.

TABLE 6

Fertilizer retention.

| | Total Fertilizer A rate in slurry applied on Seed g/kg | Total Fertilizer A retained on seed analyzed through ICP g/kg |
|---|---|---|
| Dry Fertilizer A | 3.75 | 0.43 |
| Formulation A | 3.75 | 1.16 |

Example VII

Formulation C (Fertilizer A with Wax Dispersion)

Formulation C was prepared using 40% of Fertilizer A with 25% of a carnauba wax dispersion and was prepared as described below. The mixing vessel was filled with specified amount of water and carnauba wax dispersion. PC5450 (defoamer) was weighed as indicated in the recipe and added slowly to avoid air entrapment in the mix. Defoamers are usually insoluble in the target system, so a colloidal solution was expected during addition and mixing. The modified corn starch was weighed and added slowly to the vessel during mixing, with efforts made to avoid forming lumps when adding to the mixing vessel. After addition, mixing was continued for 15 minutes to ensure complete dissolution of the product. At this stage, the viscosity of the mixture was expected to increase. The mixer speed was increased to maintain adequate vortex. One quarter of the specified quantity of dry fertilizer powder was weighed and added slowly to the mixing vessel. Mixing was continued for 10 minutes to ensure homogeneous dispersion of particulates. Before adding the powder, the powder was checked to ensure a homogeneous powder without clumps. One quarter of the specified quantity of the dispersants were weighed and added to the mixing tank slowly. Mixing was continued for 10 minutes. The previous two steps were repeated until all specified weight of dry fertilizer and dispersants were added to the mixture. As a last step, the specified amount of Acticide LA 1206 was added to the mixing vessel, and mixing was continued for 5 minutes. Before addition of Acticide LA1206, it was ensured that the temperature of the tank mix was below 40° C./104° F.

TABLE 7

Liquid suspension fertilizer composition.

| Formulation C | % w/w |
|---|---|
| Water | 43.26% |
| NYS 2002 (carnauba wax) | 10.00% |

TABLE 7-continued

Liquid suspension fertilizer composition.

| Formulation C | % w/w |
|---|---|
| PC5450 (defoamer) | 0.05% |
| B792 (modified corn starch) | 2.50% |
| Fertilizer A | 40.00% |
| Esperse 349 (dispersant) | 1.00% |
| Byk-156 (dispersant) | 3.00% |
| Acticide LA1206 (biocide) | 0.19% |

TABLE 8

Formulation C physical properties.

| Property | Value |
|---|---|
| Density | 1.37 ± 0.05 g/ml |
| % Solids | 46.00 ± 2.00% |
| Viscosity | 2.5 rpm: 5600 cP (±2000) |
| | 25 rpm: 1000 cP (±400) |
| | 50 rpm: 600 cP (±100) |
| pH | 4.5 to 5.0 |
| Color | White to off-white |

Example VIII

Formulations D and E

Formulation D was prepared with 50% Fertilizer B, and Formulation E was prepared with 55% Fertilizer A. The blending methodology for both formulations are similar except for the ingredients used as described in Tables 9 and 11, below.

The mixing vessel was filled with specified amount of water and a laminar vortex created. Defoamer weighed as indicated in the recipe and added slowly to avoid air entrapment in the mix. Defoamers are usually insoluble in the target system, so expected to see a colloidal solution during addition and mixing. Weighed and added surfactant slowly to avoid foam. Weighed rheology additive and added slowly to the vessel during mixing. Avoided forming lumps when adding to the mixing vessel. After addition, continued mixing for 15 minutes to ensure complete dissolution of the product. At this stage, viscosity of the mixture was expected to increase. Mixer speed was increased to maintain adequate vortex. Weighed 50% weight of dry fertilizer and added it slowly to the mixing vessel and immediately added 50% weight of dispersants. Continued mixing for 20 minutes to ensure homogeneous dispersion of particulates. Before adding the powder, ensured powder was homogeneous without clumps. Weighed remaining 50% of dry fertilizer and added it slowly to the mixing vessel and immediately add remaining 50% weight of dispersants. Continued mixing for 20 minutes to ensure homogeneous dispersion of particulates. Before adding the powder, ensured powder was homogeneous without clumps. Temperature of the blend was maintained below 40° C. and added specified amount of biocide as indicated. The blend was filtered through a mesh not greater than mesh size No. 2000 to separate any undispersed particulates or clumps.

TABLE 9

Liquid suspension fertilizer composition (Formulation D).

| Formulation D | % w/w |
|---|---|
| Water | 46.19 |
| PC5450 (defoamer) | 0.05 |
| Dowfax 3B2 (surfactant) | 0.10 |
| Laponite-EP (rheology additive) | 0.47 |
| Fertilizer B | 50.00 |
| Byk-156 (dispersant) | 3.00 |
| Acticide LA1206 (biocide) | 0.19 |

TABLE 10

Formulation D physical properties.

| Property | Value |
|---|---|
| Density | 1.65 ± 0.05 g/ml |
| % Solids | 52.00 ± 2.00% |
| Viscosity | 2.5 rpm: 7400 cP (±2000) |
| | 25 rpm: 1100 cP (±400) |
| | 50 rpm: 900 cP (±100) |
| pH | 4.5 to 5.0 |
| Color | Brown to Pink |

TABLE 11

Liquid suspension fertilizer composition (Formulation E).

| Formulation E | % w/w |
|---|---|
| Water | 41.38 |
| PC5450 (defoamer) | 0.05 |
| Dowfax 3B2 (surfactant) | 0.50 |
| Xantham gum (rheology additive) | 0.07 |
| Fertilizer A | 55.00 |
| Esperse 349 (dispersant) | 3.00 |

TABLE 12

Formulation E physical properties.

| Property | Value |
|---|---|
| Density | 1.46 ± 0.05 g/ml |
| % Solids | 57.00 ± 2.00% |
| Viscosity | 2.5 rpm: 7200 cP (±2000) |
| | 25 rpm: 1100 cP (±400) |
| | 50 rpm: 900 cP (±100) |
| pH | 4.5 to 5.0 |
| Color | White to cream |

Example IX

Shelf Stability Testing

The shelf stabilities of Formulation C and Formulation D were evaluated following protocol employed by Collaborative International Pesticides Analytical Council (CIPAC) for methods MT39.3 and MT46.3. Briefly, 50 ml of formulation was placed in 25° C. and 40° C. for 2 weeks, and the formulation was observed for any settling, caking, or sagging.

A control sample without any rheology additive (xanthan gum) was also tested. The control exhibited severe settling of the particles, with the bottom layer being difficult. The settled layer for all formulation samples could be easily resuspended on agitation after settling.

TABLE 13

Stability testing, settling of suspended particles.

| Formulation | Settling top layer, mm at 25° C. | Settling top layer, mm at 40° C. |
|---|---|---|
| Formulation C | 3 | 5 |
| Formulation D | 0 | 32 |
| Formulation E | 9 | 19 |

Example X

Germination Testing

Seeds were treated by mixing together a combination of pesticide (fungicide), liquid fertilizer, red color pigment dispersant, and water in a batch rotary coater. 1 kilogram of untreated barley, soybeans, and corn seeds were treated using Formulation A, Formulation D, and Formulation E, respectively. The seeds were placed in the spinning treater bowl, and a premixed slurry was injected and allowed to spin for 10 secs, after which the seeds were collected and allowed to dry. The premixed treatment slurries were those described in Table 5 (above) from Example V (Formulation A) for barley, Table 23 (below) from Example XIV (Formulation D) for soybeans, and Table 25 (below) from Example XV (Formulation E) for corn.

Warm germination for treated seeds were performed in moist paper towels at 25° C. For each sample, 2 replicates were included, each consisting of 50 seeds. After 5 days in the germination chamber, the seeds were counted to obtain % germination. Treatments were applied at 6 oz per 100lb of seeds.

TABLE 14

% germination of treated and untreated seeds.

| Treatment Type | Treated Seeds | Untreated Seeds |
|---|---|---|
| Formulation A on barley | 97% | 98% |
| Formulation D on soybeans | 96% | 91% |
| Formulation E on corn | 90% | 89% |

All treatments across the three seed types showed no negative effect of the nutritional formulation and were comparable to the untreated seeds in each case.

Example XI

Dust and Flowability Testing

In this experiment, the addition of wax dispersion to the liquid fertilizer was tested to determine whether it helps lower dust and improves flowability. For measuring dust, 100 g of seed samples were tested for 2 minutes in the Heubach dust meter (Type I) and the results compared to controls. Seeds treated with Formulation C with carnauba wax (polymer) showed almost 50% reduction in dust compared to seeds without carnauba wax (polymer).

TABLE 15

Heubach dust in grams per ton of seeds.

| Treatment | Heubach Dust, g/ton |
|---|---|
| Formulation C with polymer | 97 |
| Formulation C without polymer | 195 |

For testing flowability of seeds, 1 kg of treated barley seeds were passed through a funnel and time recorded in seconds and compared to controls and untreated seeds. Seeds treated with Formulation C with carnauba wax (polymer) showed about 10-15% improvement in flow compared to formulation without carnauba wax (polymer).

TABLE 16

Dry flow measured in kg of seed and fertilizer per second.

| Treatment | Dry flow, kg/sec |
|---|---|
| Formulation C with polymer | 13.6 |
| Formulation C without polymer | 15.2 |
| Untreated Seeds | 9.4 |

Example XII

Growth Data for Corn

Six strip trials were organized, one each in Iowa (Richland), Kansas (Hutchinson), Missouri (Marshall), Minnesota (St Cloud), Nebraska (York), and South Dakota (Centreville) to evaluate the effect of Formulation A and Formulation E as seed treatment on corn growth and productivity.

Plot size: 4 rows of 300 ft length;

Replications: Three

Design: Randomized Complete Block Design; and

Variety: R1309VT2P.

Data were collected for early plant stand, plant vigor, and plant height. Formulation A and Formulation E seed treatment plots increased the plant stand in an average of 4% in four locations (Centreville 3.5%, Marshall 6.7%, Richland 3.5% and York 1.6%) over the standard seed treatment. At St Cloud, there was also a numerical increase in plant stand over control, but the difference was small.

TABLE 17

Plant stand.

| | Plant stand (,000)/A | | | | | |
|---|---|---|---|---|---|---|
| Treatments | Richland | Hutchinson | St Cloud | Marshall | York | Centreville |
| Standard seed treatment (T1) | 31.9ab | 29.5a | 29.8a | 29.7a | 31.4a | 31.1a |

TABLE 17-continued

Plant stand.

| | Plant stand (, 000)/A | | | | | |
|---|---|---|---|---|---|---|
| Treatments | Richland | Hutchinson | St Cloud | Marshall | York | Centreville |
| T1 + Formulation A | 32.2b | 27.1a | 29.9a | 31.7a | 31.4a | 31.5a |
| T1 + Formulation E | 33.1c | 26.3a | 28.5a | 31.7a | 31.9a | 32.1a |

Note:
identical alphabets indicate no significance among treatments

Formulation A and Formulation E seed treatment significantly increased plant vigor over the standard seed treatment in Hutchinson, Marshall and St Cloud trials at p value <0.05, and in Centreville, Richland and York at p value between 0.07 and 0.2.

TABLE 18

Plant vigor.

| | Plant vigor NDVI and 1-9 scale | | | | | |
|---|---|---|---|---|---|---|
| Treatments | Richland | Hutchinson | St Cloud | Marshall | York | Centreville |
| Standard seed treatment (T1) | 0.440a | 5.0a | 0.588a | 0.332ab | 0.403a | 5.0a |
| T1 + Formulation A | 0.487b | 5.9b | 0.610a | 0.382c | 0.415a | 5.5ab |
| T1 + Formulation E | 0.503b | 5.6b | 0.597a | 0.335ab | 0.425b | 5.7ab |

Note:
identical alphabets indicate no significance among treatments

Formulation A and Formulation E seed treatment plots in five locations resulted in larger plant height compared to the plots with standard seed treatment. At Richland location, this difference was significant in favor of the test formulations.

TABLE 19

Plant height.

| | Plant height (cm) | | | | | |
|---|---|---|---|---|---|---|
| Treatments | Richland | Hutchinson | St Cloud | Marshall | York | Centreville |
| Standard seed treatment (T1) | 41.1a | 64.0a | 41.7a | 54.5b | 39.6a | 101.0a |
| T1 + Formulation A | 42.0ab | 67.2a | 44.6a | 56.7b | 41.1a | 105.0a |
| T1 + Formulation E | 46.0c | 65.6a | 45.3a | 46.3a | 41.1a | 102.6a |

Note:
identical alphabets indicate no significance among treatments

Example XIII

Growth Data for Soybeans

A field development program was designed and executed to determine the activity of Formulation D as a seed treatment product in soybeans in the mid-south production regions. Six replicated strip trials were conducted to determine the effects of Formulation D seed treatment combined with a commercial seed treatment on soybeans crop growth and yield.

Formulation D seed treatment plots in four locations resulted in larger plant stand and plant vigour compared to the control plots.

TABLE 20

Plant stand at V1 (Vegetative Stage #1).

| Treatments | Plant stand (, 000) at V1 | | | | | |
|---|---|---|---|---|---|---|
| | Hutchinson (KS) | Marshall (MO) | Memphis (TN) | Clarence (MO) | Procter (AR) | Stoneville (MS) |
| Standard seed trt (T1) | 99.5b | 106.9b | 104.4a | 119.7a | 104.6a | 103.3a |
| T1 + Formulation D | 93.4a | 101.2a | 80.7a | 122.1a | 108.8a | 97.3a |

Note:
identical alphabets indicate no significance among treatments

TABLE 21

Plant stand at V3-V4 (Vegetative Stages #3-#4).

| Treatments | Plant stand (, 000) at V3-V4 | | | | | |
|---|---|---|---|---|---|---|
| | Hutchinson (KS) | Marshall (MO) | Memphis (TN) | Clarence (MO) | Procter (AR) | Stoneville (MS) |
| Standard seed trt (T1) | 101.3a | 109.1a | 151.3a | 119.6ab | 115.4a | 89.4a |
| T1 + Formulation D | 107.4b | 103.5a | 130.2a | 121.8bc | 115.2a | 97.8b |

Note:
identical alphabets indicate no significance among treatments

In addition, Formulation D seed treatments did not have any negative effects on crop development in all locations.

Formulation D seed treatment plots in five locations resulted root measurements (root length, root projection, root surface area, root diameter and root volume) compared to the control. There was no negative crop development effect on all Formulation D treated plots.

TABLE 22

Root measurements, Memphis (TN).

| | Root measurements, Memphis TN | | | | |
|---|---|---|---|---|---|
| Treatments | Length (cm) | Proj Area (cm$^2$) | Surf Area (cm$^2$) | Diameter (mm) | Volume (cm$^3$) |
| Standard seed trt (T1) | 130.4a | 11.2a | 35.0a | 0.89a | 0.78a |
| T1 + Formulation D | 131.6a | 11.3a | 35.5a | 0.89a | 0.78a |

Note:
identical alphabets indicate no significance among treatments

Example XIV

Formulation D Seed Growth

Treatment slurries were prepared comprising ApronXL (fungicide), red colorant and varying amounts of Formulation D. The treatments were premixed in a vial and the total treatment amount per unit of seeds was injected into the treater while the seeds were in motion. 1 kg of seeds were treated and stored for growth studies and germination tests.

TABLE 23

Treatment slurries for seed growth testing.

| Treatment Slurry | Test 1 g/kg seed | Test 2 g/kg seed | Test 3 g/kg seed |
|---|---|---|---|
| Fungicide (Apron XL) | 0.3 | 0.3 | 0.3 |
| Liquid Formulation D | 0.4 | 0.4 | 0.4 |
| Red Color Dispersant | 2.5 | 3.9 | 5 |
| Water | 4 | 2.6 | 1.5 |
| Total | 7.2 | 7.2 | 7.2 |

The treated soybeans were grown in a mixture (50:50) peat moss and perlite in the greenhouse for a period of two weeks. A basal application of NPK was performed in the pots. 4 seeds per pot and 2 pots per treatment resulted in 8 plants per treatment. The plants were harvested carefully without damaging the roots. The growth medium was washed off the roots, and the biomass was oven dried at 140° C. for 72 hrs. After drying, each plant was weighed and the mass recorded.

Warm germination was performed in wet paper towels. Two replicates of 50 seeds per treatment were placed in wet paper towels, rolled up and placed in the incubator at 25° C. for 5 days. After 5 days, the seeds that were germinated were counted and % computed by dividing by 50.

One-way ANOVA was performed to evaluate significance of weight of biomass vs treatments (confidence level=95%)

No significance difference between growth and treatments were observed (p value >0.05) for this trial. This study showed that there is no detrimental effect of fertilizer formulations on growth on seedlings in the period of two weeks.

TABLE 24

Plant growth.

| Treatment | Average biomass weight, g/plant |
|---|---|
| 2.5 g/kg | 0.2245 |
| 3.9 g/kg | 0.2651 |
| 5 g/kg | 0.2691 |
| Untreated Soy | 0.2633 |

All samples tested showed average germination above 90%, hence Formulation D showed no detrimental effect on seed safety.

Example XV

Formulation E Seed Growth

Formulation E was developed as a liquid seed treatment for monocotyledons. Application rates for corn seeds was tested to achieve the maximum seedling growth and be practically incorporated in the total slurry on seeds.

TABLE 25

Treatment slurries for seed growth testing.

| Treatment Slurry | Test 1 g/kg seed | Test 2 g/kg seed | Test 3 g/kg seed |
|---|---|---|---|
| Fungicide (Redigo Pro FS 170) | 0.575 | 0.575 | 0.575 |
| Red Color Dispersant | 0.4 | 0.4 | 0.4 |
| Liquid Formulation E | 2.5 | 3.9 | 5 |
| Water | 10 | 8.6 | 7.5 |
| Total | 13.475 | 13.475 | 13.475 |

The treated corn were grown in a mixture (50:50) peat moss and perlite in the greenhouse for a period of two weeks. A basal application of NPK was performed in the pots. 4 seeds per pot and 2 pots per treatment resulted in 8 plants per treatment. The plants were harvested carefully without damaging the roots. The growth medium was washed off the roots and the biomass was oven dried at 140° C. for 72 hrs. After drying, each plant was weighed and the mass recorded.

Warm germination was performed in wet paper towels. Two replicates of 50 seeds per treatment were placed in wet paper towels, rolled up and placed in the incubator at 25° C. for 5 days. After 5 days, the seeds that were germinated were counted and % computed by dividing by 50.

One-way ANOVA was performed to evaluate significance of weight of biomass vs treatments (confidence level=95%). No significance difference between growth and treatments were observed (p value >0.05) for this trial. This study showed that there is no detrimental effect of fertilizer formulations on growth on seedlings in the period of two weeks.

TABLE 26

Plant growth.

| Treatment | Average biomass weight, g/plant |
|---|---|
| 2.5 g/kg | 0.2245 |
| 3.9 g/kg | 0.2651 |
| 5 g/kg | 0.2691 |
| Untreated Corn | 0.2633 |

All samples tested showed average germination above 90%, hence Formulation E showed no detrimental effect on seed safety.

The invention claimed is:

1. An aqueous liquid fertilizer composition comprising:
   (a) a nutrient source comprising a source of zinc and a source of manganese and one or more sources of macronutrients, wherein the zinc is present in the nutrient source in an amount of about 15% to about 25% by weight and the manganese is present in the nutrient source in an amount of about 1% to about 10% weight based on the total weight of the source of the nutrient taken as 100% by weight, and wherein the one or more sources of macronutrients include phosphorus in a content of about 20% to about 30% by weight and nitrogen in a content of about 0.5% to about 8% by weight, based on the total weight of the source of the nutrient taken as 100% by weight,
   (b) from about 0.01% to about 1% by weight of a thickener, based on the total weight of the liquid fertilizer composition taken as 100% weight, and
   (c) from about 0.1% to about 10% by weight of a dispersant, based on the total weight of the liquid fertilizer composition taken as 100% weight, and wherein the composition has a suspended solids content of at least about 30% by weight, and wherein the composition comprises less than about 2% by weight styrene(meth)acrylic copolymer based on the total weight of the liquid fertilizer composition taken as 100% weight, and wherein the nutrient source is provided as a powder having an average particle size of about 100 mesh to about 325 mesh, and wherein the liquid fertilizer composition comprises about 20% to about 80% by weight of the nutrient source, based on the total weight of the liquid fertilizer composition taken as 100% by weight.

2. The aqueous liquid fertilizer composition of claim 1, wherein the manganese is present in an amount of about 5% based on the total weight of the source of the nutrient taken as 100% by weight.

3. The aqueous liquid fertilizer composition of claim 2, wherein the zinc is present in an amount of about 20% based on the total weight of the source of the nutrient taken as 100% by weight.

4. The aqueous liquid fertilizer composition of claim 1, further comprising from about 0.01% to about 1% by weight of a defoamer, based on the total weight of the liquid fertilizer composition taken as 100% weight.

5. The aqueous liquid fertilizer composition of claim 1, further comprising from about 0.01% to about 1% by weight of a preservative, based on the total weight of the liquid fertilizer composition taken as 100% weight.

6. A method of treating a seed or fertilizer granule comprising applying the liquid fertilizer composition of claim 1 to the surface of one or more seeds or granules.

7. The method of claim 6, further comprising adding one or more insecticides, fungicides, nematicide, biologically active components, polymers, or a combination of thereof, to the liquid fertilizer composition.

* * * * *